United States Patent [19]

Shiraishi et al.

[11] 4,226,966
[45] Oct. 7, 1980

[54] METHOD FOR PRODUCING VINYL CHLORIDE RESINS

[75] Inventors: Makoto Shiraishi; Hiroshi Uchida, both of Kurashiki; Yoshinori Koizumi, Toyama; Akira Saito, Ibaragi, all of Japan

[73] Assignee: Kurara Co., Ltd., Kurashiki, Japan

[21] Appl. No.: 880,557

[22] Filed: Feb. 23, 1978

Related U.S. Application Data

[63] Continuation of Ser. No. 667,654, Mar. 17, 1976, abandoned.

[30] Foreign Application Priority Data

Mar. 24, 1975 [JP] Japan .................................. 50/35233

[51] Int. Cl.$^2$ ........................... C08F 2/20; C08F 2/02;
 C08F 118/08; C08F 114/06
[52] U.S. Cl. ................................... 526/202; 526/208;
 526/319; 526/344.2
[58] Field of Search ..................... 526/202, 208, 344.2,
 526/319

[56] References Cited

U.S. PATENT DOCUMENTS

| | | | |
|---|---|---|---|
| 2,356,562 | 8/1944 | Berg | 526/202 X |
| 2,535,189 | 12/1950 | Benson | 526/202 |
| 2,812,318 | 11/1957 | Kreager | 526/202 |
| 3,817,959 | 6/1974 | Balwé | 526/200 |
| 3,842,055 | 10/1974 | Gabriel | 526/202 |
| 3,929,753 | 12/1975 | Itoh | 526/202 |

FOREIGN PATENT DOCUMENTS

| | | | |
|---|---|---|---|
| 815109 | 6/1969 | Canada | 526/208 |
| 991134 | 5/1965 | United Kingdom | 526/208 |

OTHER PUBLICATIONS

Schildknecht, C. W., Vinyl and Related Polymers, Wiley & Sons (NY), pp. 330, 331, 343 (1952).

*Primary Examiner*—C. A. Henderson
*Attorney, Agent, or Firm*—Burns, Doane, Swecker & Mathis

[57] ABSTRACT

A method for suspension polymerizing vinyl chloride monomer, or a mixture thereof with copolymerizable monomers, employs as a suspension stabilizer a partially saponified polyvinyl alcohol having a degree of saponification between about 60 and about 90 mol percent, and a solubility-in-methanol index at 55° C. in a range of up to about 60 percent.

4 Claims, No Drawings

METHOD FOR PRODUCING VINYL CHLORIDE RESINS

This is a continuation of Ser. No. 667,654, filed Mar. 17, 1976, now abandoned.

BACKGROUND AND SUMMARY OF THE INVENTION

The present invention relates generally to methods for producing vinyl chloride resins, and, more especially to a method for producing an improved vinyl chloride resin, employing a particular partially saponified polyvinyl alcohol stabilizer. The particular polyvinyl alcohol exhibits excellent dispersion-stabilizing activity in the suspension polymerization, in aqueous medium, of vinyl chloride monomer or a mixture of vinyl chloride as a major monomeric component and one or more monomers copolymerizable therewith as a minor monomeric component. In another aspect, the invention is directed to a vinyl chloride resin which has an improved particle size distribution with a minimum of coarse beads, excellent processability and a significantly reduced residual vinyl chloride content, the resin being obtainable by the aforementioned method.

One commonly employed commercial method for producing vinyl chloride homopolymer or copolymer resins, both of which are widely utilized, is that process termed suspension polymerization, whereby vinyl chloride monomer alone or a mixture thereof with one or more copolymerizable monomers is dispersed by addition to a stirred aqueous medium, in the presence of a suspension stabilizer, the polymerization reaction being conducted with the aid of an oil-soluble catalyst. Among the factors generally governing the quality of the product resin are the degree of polymerization, monomer-to-water ratio, temperature, the amount of catalyst, the engineering of the autoclave, the rate of agitation, and the type and amount of suspension stabilizer employed. However, it has been found from experience that the type of suspension stabilizer is a most critical factor. Known dispersing agents for the polymerization of vinyl chloride monomer include water-soluble polymers such as cellulose derivatives, e.g., methyl cellulose, carboxymethyl cellulose, etc., and partially saponified polyvinyl alcohols, the latter being the more often employed in current commercial processes.

The desired characteristics of the suspension stabilizer, i.e., dispersing agent, employed in this polymerization reaction include a high dispersing power even when used in a small amount and, an ability to yield a product polyvinyl chloride resin having a particle size distribution as uniform as possible with a small mean particle size, adequate porosity and improved processability, less susceptible to the formation of fish eyes on further processing, and a significantly reduced residual vinyl chloride monomer content. However, the resins in the vinyl chloride series produced according to the aforementioned prior art methods employing known suspension stabilizers are not satisfactory in porosity, particle size distribution and mean particle diameter, and yield a high vinyl chloride residual monomer content further contributing to poor overall processability.

Regarding the physical properties of polyvinyl alcohols, the average degree of polymerization, the average degree of saponification, etc., must be within certain ranges appropriate for the stabilization of dispersions. It is known that modified polyvinyl alcohols containing carbonyl groups within the respective molecules, obtainable by hydrolyzing the polyvinyl esters resulting from polymerization in the presence of an aldehyde or ketone, are suitable as suspension stabilizers for the suspension polymerization of vinyl chloride monomer.

Heretofore attempts have been made to meet the above performance requirements by selecting a suitable combination of such factors as the degree of polymerization of polyvinyl alcohol, the degree of saponification thereof and the distribution of residual acetyl groups. But, the attempts have met with only limited success. Thus, it is generally known that the use of a partially saponified polyvinyl alcohol having a high degree of polymerization and a high degree of saponification provides a high dispersing power and, therefore, a product resin having a uniform distribution of relatively small particle sizes, but the resin is inadequate in porosity and in the ability to absorb plasticizers. Conversely, a low degree of saponification makes for excellent porosity and an improved rate of plasticizer absorption but the low dispersing power of such polyvinyl alcohol leads merely to the production of vinyl chloride resin particles which are large in diameter and exhibiting a high residual vinyl chloride monomer content.

DETAILED DESCRIPTION OF THE INVENTION

In response to the deficiencies of the prior art it has been determined that, in the suspension polymerization of vinyl chloride monomer, all the aforesaid diverse performance requirements are obtainable by employing, as a suspension stabilizer, a partially saponified polyvinyl alcohol which has a degree of saponification in the range of from about 60 to about 90 mol%, preferably 60 to 80 mol%, and a solubility-in-methanol index of up to 60%, preferably 10 to 60%, and which will not flocculate from a 0.1% aqueous solution thereof under the shearing stress of stirring at a temperature of 30° to 65° C. The degree of polymerization of the partially saponified polyvinyl alcohol is not critical, but a low-saponified polyvinyl alcohol having a high degree of polymerization will not be completely soluble in water at room temperature. Thus, it is preferable to employ a polyvinyl alcohol having a degree of polymerization in the range of not more than 2500, since polyvinyl alcohols whose degrees of polymerization are not in excess of 2500 are water-soluble at room temperature when the degree of saponification is within the range of 60 to 90 mol%.

Notwithstanding its low degree of saponification, a partially saponified polyvinyl alcohol which does not flocculate upon stirring is capable of providing a vinyl chloride resin having a uniform particle size distribution, even when employed in a relatively small quantity, due to its high dispersing power, to be explained more fully hereinbelow. Moreover, by using a partially saponified polyvinyl alcohol which has a solubility-in-methanol index of 10 to 60 percent and which, as aforesaid, will not flocculate on stirring, the resultant vinyl chloride resin exhibits surprising and unexpected increases in overall quality.

Although a detailed mechanism remains yet to be elucidated, and we do not desire to be bound to any particular theory, the following hypothesis may reasonably account for the excellent performance of a partially saponified polyvinyl alcohol which has a solubility-in-methanol index in the range of 10 to 60 percent, and which will not flocculate out of aqueous solution under the shearing stress of stirring at elevated temperatures.

For instance, a polyvinyl alcohol having a low degree of saponification is readily soluble in cold water but as the temperature of water is increased, the solubility drops considerably until, finally, it is precipitated. This temperature at which the polyvinyl alcohol begins precipitation is known as its cloud point. In the suspension polymerization of vinyl monomers in general, sparingly soluble inorganic powders such as calcium carbonate, barium sulfate, calcium phosphate, bentonite, etc., are sometimes added. These additive agents, as it is generally believed, serve to prevent re-coalescence of the suspended monomer droplets.

In the suspension polymerization of vinyl chloride monomer in the presence of a partially saponified polyvinyl alcohol, monomer droplets are dispersed and suspended by the surface tension of the stabilizer employed, as well as by stirring. It is also believed that these droplets are stabilized by the polyvinyl alcohol molecules adsorbed on the surfaces of the droplets and the polymerization reaction proceeds under such conditions. The methanol-soluble fraction of the partially saponified polyvinyl alcohol used in accordance with this invention is readily soluble in water as well. Moreover, this polyvinyl alcohol has not only a comparatively high cloud point but does not flocculate under the shearing stress of stirring even at temperatures beyond said cloud point.

Generally, if an aqueous solution of polyvinyl alcohol is stirred at temperatures beyond the cloud point, a precipitate will flocculate and the resulting floc will have a tendency of adhering to the vessel wall or impeller. Oftentimes, the floc is filtered and, thus, the concentration of polyvinyl alcohol in the aqueous solution is diminished. In the case of the partially saponified polyvinyl alcohol used in the present invention, precipitates initially formed in aqueous medium remain stable and, as they are soluble in water, the concentration of polyvinyl alcohol dissolving in aforementioned medium does not essentially decrease in the course of this process. It is thought that if such a polyvinyl alcohol having a high solubility-in-methanol index is used as a suspension stabilizer, it will have a lesser propensity to precipitate, even at relatively high temperatures, thus contributing more effectively to the stability of the dispersion.

Furthermore, although the portion of polyvinyl alcohol that has remained unadsorbed precipitates as the temperature is increased, it remains stable in finely divided condition without being significantly affected by the high shearing stress of stirring. Thus, such polyvinyl alcohol displays a behavior similar to that of the aforementioned sparingly soluble inorganic powders, preventing re-coalescence of the suspended monomer particles and, accordingly, giving rise to a vinyl chloride resin exhibiting a uniform particle size distribution and a small mean particle diameter. Furthermore, because of the unusually high dispersing power of the methanol-soluble fraction of the polyvinyl alcohol according to this invention, the suspended droplets formed in an initial stage of polymerization are extremely fine. Therefore, the product polymer particles that will be formed by the cohesion of some of such fine particles will have a high degree of porosity with a small average pore diameter in spite of the small diameter of the polymer particle. Thus, notwithstanding its small particle diameter, uniform particle size distribution and high porosity, the vinyl chloride resin obtainable by the method of this invention has a high apparent specific gravity and a reduced residual monomer content, thus fulfilling all the aforementioned performance requirements.

Accordingly, the method of the present invention makes possible and practicable the polymerization of vinyl chloride monomer using, as a suspension stabilizer, a partially saponified polyvinyl alcohol whose methanol-soluble fraction and tendency toward flocculation have been properly controlled, whereby it is capable to freely control the performance characteristics of product vinyl chloride resin, including mean particle diameter, particle size distribution, residual vinyl chloride monomer content and so forth. This method thus provides a measurable and desirable advance over the conventional processes heretofore employed to this end.

The "solubility-in-methanol index" at 55° C. of a partially saponified polyvinyl alcohol, as the term is used herein is defined as the percentage obtained by adding a sample of polyvinyl alcohol to 20 times its volume of methanol, stirring the mixture at 55° C. for 2 hours and, after filtration and drying, weighing the dried filtrate to determine the weight reduction of the sample. Whether a partially saponified polyvinyl alcohol will flocculate or not is ascertained by stirring an 0.1-percent aqueous solution of the polyvinyl alcohol at 60° C. and 1200 r.p.m. for 30 minutes, subjecting the mixture immediately to suction-filtration and comparing the concentration of the filtrate with the concentration of the initial sample solution.

The partially saponified polyvinyl alcohol employed according to this invention may be prepared by various procedures, i.e., by employing suitable conditions in each of the stages of the polymerization of vinyl acetate, saponification of polyvinyl acetate, and after-treatments inclusive of a drying step, and adopting such conditions in suitable combinations. Taking the polymerization of vinyl acetate as an example, block or suspension polymerization is carried out in the presence of a chain transfer agent such as acetaldehyde to attain a rate of polymerization as high as possible (at least 80%) to obtain the desired degree of polymerization. In the multi-stage continuous polymerization process, the above may be accomplished by controlling the polymerization fragments in the respective stages. In the saponification of polyvinyl acetate, an exemplary procedure consists in performing the saponification in the presence of methyl acetatemethanol at a temperature as low as practicable over an extended period of time. After-treatments, including the drying step, may, for example, be effected by drying or including a heat-treatment in air at a suitable temperature.

It will be appreciated that the suspension stabilizer according to this invention may be employed not only in conjunction with the homopolymerization of vinyl chloride monomer and the copolymerization of vinyl chloride monomer with one or more monoolefinically unsaturated comonomers copolymerizable therewith, but also in the polymerization of other monoolefinically unsaturated vinyl monomers such as styrene, methyl methacrylate, and the like.

The following examples are provided as illustrative of this invention, and are not to be considered limitative in any manner.

EXAMPLE 1

One hundred parts ["parts" herein are parts by weight] of vinyl acetate were mixed with 1.0 part of acetaldehyde, followed by the addition of azobisisobutyronitrile as a polymerization initiator. The reaction was conducted at 56°–58° C. for 10 hours, whereupon the polymerization was terminated, and the degree of polymerization of the reaction product was observed to be 97%. Thereafter, methanol vapor was passed into the reaction mixture to remove the unreacted vinyl acetate and acetaldehyde. A 55% methanolic solution of polyvinyl acetate was obtained.

To 100 parts of this methanolic solution of polyvinyl acetate were added 18.3 parts of methyl acetate together with 65.0 parts of methanol: the concentration of polyvinyl acetate was thus reduced to 30%. Under vigorous stirring, a 5% solution of sodium hydroxide in aqueous methanol was added, at a mol ratio of alkali of 0.0045, and was maintained at a reduced temperature of 20° C. for a sufficient time to effect saponification. The product was then dried.

This procedure yields a partially saponified polyvinyl alcohol which was found to exhibit a degree of polymerization of 740, a degree of saponification of 7.14 mol%, a solubility-in-methanol index at 55° C. of 30.2% and a flocculation factor of 0% as determined by stirring a 0.1% aqueous solution of the product at 60° C. and 1200 r.p.m. for 30 minutes.

Thereafter, a 200-liter autoclave of stainless steel, equipped with a stirrer, was charged with 100 parts of vinyl chloride, 200 parts of deionized water, 0.2 parts of the above-described partially saponified polyvinyl alcohol as a suspension stabilizer, and 0.2 parts of lauroyl peroxide as a polymerization catalyst. Suspension polymerization was carried out at 60° C.

The performance characteristics of the resultant vinyl chloride resin powder are set forth in Table I.

EXAMPLE 2

One hundred parts of vinyl acetate were mixed with 1.8 parts of acetaldehyde, 200 parts of deionized water and, as a suspension stabilizer, 0.5 parts of a partially saponified polyvinyl alcohol having a degree of polymerization of 2,400 and a degree of saponification of 88 mol%, followed by the addition of 0.3 parts of benzoyl peroxide as a polymerization initiator. Under vigorous stirring, suspension polymerization was carried out at 60° C. for 8 hours. The polymerization reaction was terminated when the degree of polymerization was 99%. Then, the polymer was recovered by filtration, rinsed with water, dried and dissolved in methanol. This procedure yields a 55% methanolic solution of polyvinyl acetate.

The resultant methanolic solution of polyvinyl acetate was saponified under the same conditions as described in Example 1. Upon drying, there was obtained a partially saponified polyvinyl alcohol having a degree of polymerization of 810, a degree of saponification of 71.0 mol%, a solubility-in-methanol index of 27.5% at 55° C. and a flocculation factor of 0.1% as determined by stirring an 0.1% aqueous solution thereof at 60° C. and 1,200 r.p.m. for 30 minutes. Using this partially saponified polyvinyl alcohol as a suspension stabilizer, suspension polymerization was carried out under the same conditions as described in Example 1.

Performance data on the resultant vinyl chloride resin powder also appear in Table I.

CONTROL EXAMPLE 1

One hundred parts of vinyl acetate were mixed with 2.5 parts of acetaldehyde, followed by the addition of 0.01 parts of azobisbutyronitrile as a polymerization initiator. The reaction was carried out at 56°–58° C. for 4 hours. The polymerization reaction was terminated at a low degree of polymerization, i.e., 40%, and methanol vapor were introduced into the reaction system to remove the unreacted vinyl acetate and acetaldehyde. The procedure provided a 55% methanolic solution of polyvinyl acetate.

This methanolic solution of polyvinyl acetate was saponified under the same conditions as described in Example 1 and dried. This procedure provided a partially saponified polyvinyl alcohol having a degree of polymerization of 780, a degree of saponification of 71.8 mol%, a solubility-in-methanol index at 55° C. of 8.3%, and a flocculation factor of 0.1% as determined by stirring a 0.1% aqueous solution thereof at 60° C. and 1,200 r.p.m. for 30 minutes.

Employing this partially saponified polyvinyl alcohol as a suspension stabilizer, suspension polymerization was conducted under the same conditions as described in Example 1. The performance characteristics of the resultant vinyl chloride resin are also shown in Table I.

Although the resin of this control example, obtained with a partially saponified polyvinyl alcohol having a solubility-in-methanol index of less than 10% as a suspension stabilizer, exhibited a somewhat improved mean particle diameter, it is significantly inferior to the products obtained in accordance with the procedures of Examples 1 and 2 regarding such factors as the relative proportion of coarse particles, the formation of fish-eyes, the percentage of residual vinyl chloride monomer, and so forth. The importance of the solubility-in-methanol index thus becomes abundantly evident.

CONTROL EXAMPLE 2

To 100 parts of a 55% methanolic solution of polyvinyl acetate identical with that employed in Example 1 were added 12.2 parts of methyl acetate together with 10.0 parts of methanol. The concentration of polyvinyl acetate in the saponification reaction system was 45%. This solution was saponified with a 5% solution of sodium hydride in aqueous methanol, at a mol ratio of alkali of 0.011, at 40° C., followed by drying. The procedure provided a partially saponified polyvinyl alcohol having a degree of polymerization of 740, a degree of saponification of 70.8 mol%, a solubility-in-methanol index at 55° C. of 32.6% and a flocculation factor of 45.9% as determined by stirring an 0.1% aqueous solution thereof at 60° C. and 1,200 r.p.m. for 30 minutes.

Using this partially saponified polyvinyl alcohol as a suspension stabilizer, suspension polymerization was conducted under the same conditions as described in Example 1. The performance characteristics of the resultant vinyl chloride resin are also set forth in Table I.

As compared with the vinyl chloride resin obtained in Examples 1 and 2, the resin of this control example, produced by using a partially saponified polyvinyl alcohol having a high flocculation factor as a suspension stabilizer, includes more coarse particles, has a lower apparent specific gravity, gives rise to a greater number of fish-eyes and contains a larger amount of residual vinyl chloride monomer. Thus, the quality of product vinyl chloride resin powder is highly unsatisfactory when there is employed a partially saponified polyvinyl alcohol which will flocculate on stirring, even if its solubility-in-methanol index is high.

It is thus apparent from the above examples that a partially saponified polyvinyl chloride meeting the aforementioned methanol-solubility and flocculation factor conditions according to the present invention is not only suitable for the production of vinyl chloride resin of high quality, but provides both superior and unexpected results compared with those of the prior art.

CONTROL EXAMPLE 3

Using a partially saponified polyvinyl alcohol having a degree of polymerization of 730 and a degree of saponification of 72.6 mol% (Trade name Alcotex 75 L, Levertex, England) as a suspension stabilizer, suspension polymerization was conducted under the same conditions as described in Example 1. The performance characteristics of the resultant vinyl chloride resin are also shown in Table I. It is apparent that the resin according to this invention is superior in apparent specific gravity, mean particle diameter, fish-eye quality, residual vinyl chloride monomer content, etc.

While the solubility-in-methanol index at 55° C. of the above partially saponified polyvinyl alcohol is 28.5%, its flocculation factor as determined by stirring an 0.1% aqueous solution thereof at 60° C. and 1,200 r.p.m. for 30 minutes is as high as 25.4%.

While there have been described and pointed out the fundamental novel features of the invention as applied to the preferred embodiments, those skilled in the art will appreciate that various modifications, changes and omissions in the method for producing vinyl chloride resins illustrated and described can be made without departing from the spirit of the invention. It is the intention, therefore, to be limited only by the scope of the appended claims.

What is claimed is:

1. A method for producing a polyvinyl chloride resin comprising suspension polymerizing vinyl chloride monomer in the presence of an effective amount of a suspension stabilizer of a partially saponified polyvinyl alcohol having simultaneously: (a) a degree of saponification in the range of from 60 to 90 mol percent; (b) a solubility-in-methanol index at 55° C. in the range of from 10 to 60 percent; and, (c) a solubility in aqueous solution whereby said suspension stabilizer will not flocculate from a stirred 0.1 percent aqueous solution at a temperature in the range of from 30° C. to 65° C.

2. The method as defined by claim 1, wherein the polyvinyl alcohol has a degree of polymerization no greater than about 2500.

3. The method as defined by claim 1, said polyvinyl alcohol produced by (a) polymerizing vinyl acetate in the presence of a member selected from the group consisting of ketone and aldehyde to obtain a modified polyvinyl acetate at a conversion of polymerization of at least 80%; and, (b) hydrolyzing said polyvinyl acetate with alkali in the presence of methyl acetate and methanol.

4. The method as defined by claim 1, wherein said polyvinyl alcohol has a degree of saponification in the range of from 60 to 80 mol percent.

TABLE I

| | | Ex. 1 | Ex. 2 | Con. Ex. 1 | Con. Ex. 2 | Con. Ex. 3 |
|---|---|---|---|---|---|---|
| Quality of suspension stabilizer [partially saponified polyvinyl alcohol] | Degree of polymerization | 740 | 810 | 780 | 740 | 730 |
| | Degree of saponification | 71.4 | 71.0 | 71.8 | 70.8 | 72.6 |
| | Solubility-in-methanol index[*1] (55°C.) (%) | 30.2 | 27.5 | 8.3 | 32.6 | 28.5 |
| | % Flocculation from 0.1% aqueous solution[*2] (60°C.) (%) | 0 | 0.1 | 0.1 | 45.9 | 25.4 |
| Performance of vinyl chloride resin | Apparent specific gravity (g/cc) | 0.512 | 0.508 | 0.486 | 0.478 | 0.480 |
| | Coarse particles (42 mesh on) (%) | 0.1 | 0.2 | 10.8 | 21.2 | 11.2 |
| | Mean particle diameter ($\mu$) | 130 | 132 | 148 | 172 | 155 |
| | Fish-eyes[*3] (number/10 cm$^2$) | | | | | |
| | 4 min. | 9 | 8 | 385 | 3,850 | 18 |
| | 5 min. | 4 | 5 | 142 | 1,600 | 10 |
| | 6 min. | 0 | 0 | 35 | 380 | 7 |
| | 8 min. | 0 | 0 | 0 | 13 | 0 |
| | Residual vinyl chloride monomer (ppm)[*4] | 1 | 2.5 | 85 | 200 | 100 |

[*1] Each sample of polyvinyl alcohol is added to 20 times its volume of methanol, stirred at 55° C. for 2 hours, filtered, dried and weighed to find the difference from the original weight of the sample.
[*2] An 0.1% aqueous solution of each sample is stirred at 60° C. and 1,200 r.p.m. for 30 minutes, after which it is quickly filtered under suction, and the concentration of the filtrate is measured to find the amount of decrease from the initial concentration of the sample.
[*3] 100 parts of vinyl chloride polymer are compounded with 50 parts of dioctyl phthalate, 1 part of lead stearate and 1 part of barium stearate. The roll temperature is 150° C.
[*4] A sample of resin is dissolved in tetrahydrofuran and the amount of residual monomer is measured by means of a gas chromotographic apparatus equipped with an electron-capture detector.

* * * * *